United States Patent
Masuda

(10) Patent No.: US 8,649,376 B2
(45) Date of Patent: Feb. 11, 2014

(54) TRANSMISSION APPARATUS, TRANSMISSION METHOD, AND PROGRAM

(75) Inventor: Yasuto Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 13/065,243

(22) Filed: Mar. 17, 2011

(65) Prior Publication Data

US 2011/0243132 A1  Oct. 6, 2011

(30) Foreign Application Priority Data

Mar. 30, 2010 (JP) ................. P2010-079071

(51) Int. Cl.
*H04L 12/28* (2006.01)

(52) U.S. Cl.
USPC .......................................... 370/390

(58) Field of Classification Search
None
See application file for complete search history.

(56) References Cited

U.S. PATENT DOCUMENTS

| | | | | |
|---|---|---|---|---|
| 7,512,084 | B2 * | 3/2009 | Jalonen ..................... | 370/312 |
| 2003/0145102 | A1 * | 7/2003 | Keller-Tuberg ............ | 709/237 |
| 2007/0183418 | A1 * | 8/2007 | Riddoch et al. ............ | 370/389 |
| 2007/0263626 | A1 * | 11/2007 | Warden ..................... | 370/390 |
| 2007/0291755 | A1 * | 12/2007 | Cheng et al. .............. | 370/390 |
| 2008/0298274 | A1 | 12/2008 | Takashige et al. | |

FOREIGN PATENT DOCUMENTS

JP 2008-294717 A  12/2008

* cited by examiner

*Primary Examiner* — Dang Ton
*Assistant Examiner* — Ronald H Davis
(74) *Attorney, Agent, or Firm* — Sony Corporation

(57) ABSTRACT

There is provided a transmission apparatus including a virtual I/F control section which outputs data to be transmitted, a packet generation processing section which generates a packet containing the data, a storage section which stores a plurality of destinations of the packet, a virtual I/F which sequentially performs, to the plurality of destinations, processing of rewriting a destination set in the packet generated by the packet generation processing section by one of the plurality of destinations stored in the storage section, and outputting the packet in which the destination is rewritten, and a real interface which transmits, every time the packet is output from the virtual I/F, the packet to the destination set in the packet.

9 Claims, 11 Drawing Sheets

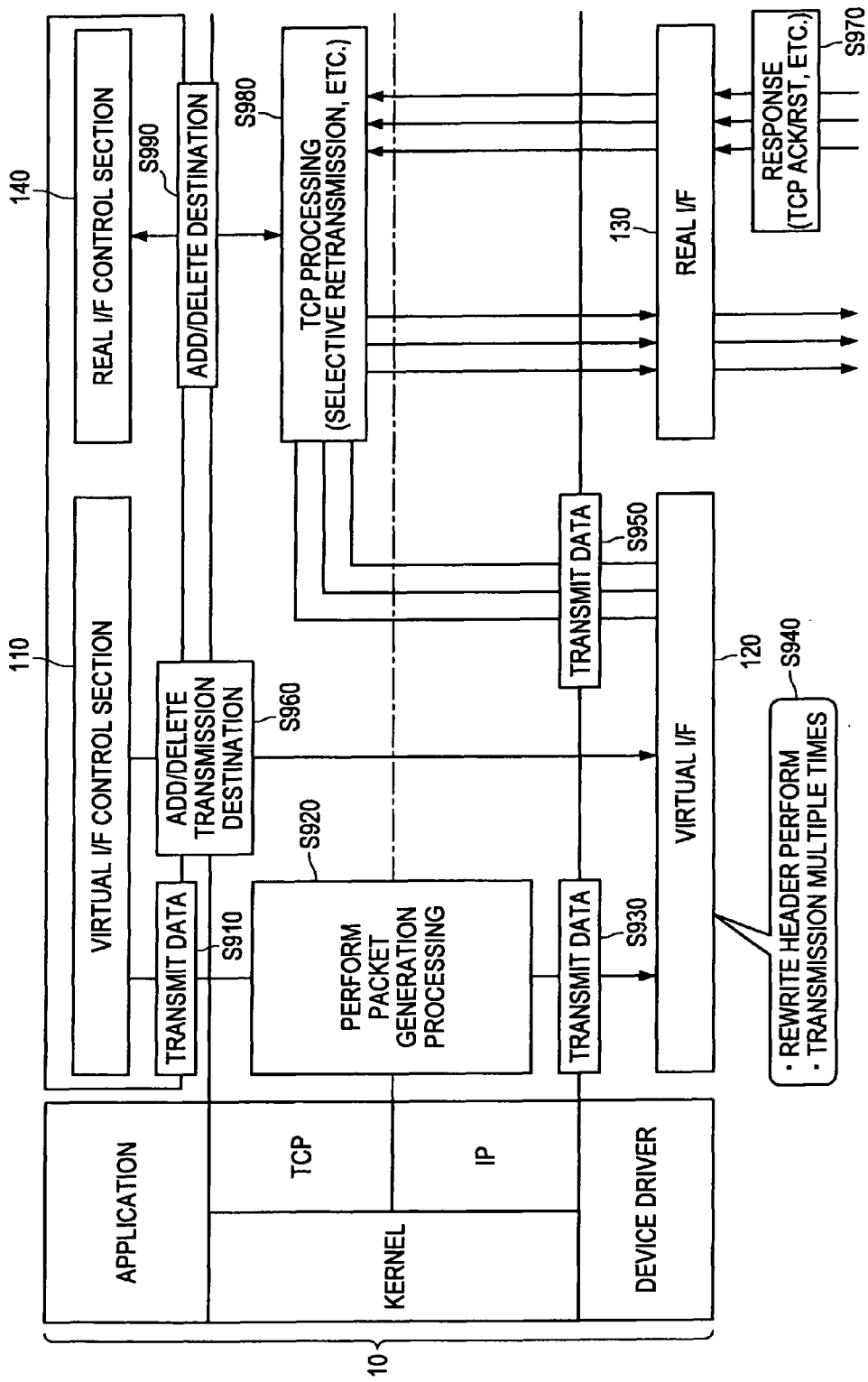

TRANSMISSION APPARATUS, TRANSMISSION METHOD, AND PROGRAM

CROSS-REFERENCE TO RELATED APPLICATION

The present application claims priority from Japanese Patent Application No. JP 2010-079071 filed in the Japanese Patent Office on Mar. 30, 2010, the entire content of which is incorporated herein by reference.

BACKGROUND OF THE INVENTION

1. Field of the Invention

The present invention relates to a transmission apparatus, a transmission method, and a program.

2. Description of the Related Art

In recent years, there have been disclosed various technologies for a transmission apparatus to transmit identical data to multiple destinations. As a first technique, there is disclosed a technology for transmitting a packet multiple times by unicast not via a virtual network interface (hereinafter, also referred to as "virtual I/F"). For example, the technology disclosed in JP-A-2008-294717 is for avoiding, in the case where there is a bottleneck in a network band, the bottleneck by simultaneously using multiple interfaces.

Further, as a second technique, there is disclosed a technology for transmitting a packet to multiple destinations by using IP (Internet Protocol) multicast. According to the technology utilizing the IP multicast, the number of times of packet generation processing may be one and the number of times of transmission processing may be one, and hence, the load on a CPU is reduced.

SUMMARY OF THE INVENTION

However, in the technology of performing the transmission multiple times by unicast not via the virtual I/F, the IP packet generation processing is to be performed the same number of times as the number of destinations, and hence, there was an issue that the load on the CPU became large. In particular, in the technology disclosed in JP-A-2008-294717, there was an issue that it was difficult to avoid the bottleneck when the load on the CPU became large.

In the technology for transmitting a packet to multiple destinations by using IP multicast, there was an issue that it was necessary that the network support IP multicast and it was difficult to use IP multicast in the case of performing communication via a network which did not support IP multicast. Further, since all the packets to be transmitted are multicast, there was an issue that it was difficult to selectively retransmit a packet.

In light of the foregoing, it is desirable to provide a novel and improved technology which, when the transmission apparatus transmits a packet to multiple destinations via a network, can reduce the load on a CPU of a transmission apparatus regardless of the type of the network.

According to an embodiment of the present invention, there is provided a transmission apparatus which includes a virtual interface control section which outputs data to be transmitted, a packet generation processing section which generates a packet containing the data, a storage section which stores a plurality of destinations of the packet, a virtual interface which sequentially performs, to the plurality of destinations, processing of rewriting a destination set in the packet generated by the packet generation processing section by one of the plurality of destinations stored in the storage section, and outputting the packet in which the destination is rewritten, and a real interface which transmits, every time the packet is output from the virtual interface, the packet to the destination set in the packet.

The virtual interface control section may generate a socket for transmission, and may output the packet to the virtual interface via the generated socket for transmission.

The transmission apparatus may further include a real interface control section which generates a socket for reception for each of the destinations stored in the storage section, and which, when receiving a response indicating that an error in transmission of the packet has occurred via the real interface using the generated socket for reception, outputs, to the virtual interface control section, a destination deletion request indicating that the destination corresponding to the socket for reception which has received the response is deleted from the destinations stored in the storage section.

When the destination deletion request is output from the real interface control section, the virtual interface control section may output, to the virtual interface, a destination deletion request indicating that the destination is deleted from the destinations stored in the storage section. When the destination deletion request is output from the virtual interface control section, the virtual interface may delete the destination from the destinations stored in the storage section.

The transmission apparatus may further include a real interface control section which generates a socket for retransmission for each of the destinations stored in the storage section, and which, when receiving a response indicating that a loss of the packet has occurred via the real interface using the generated socket for retransmission, retransmits the packet which is lost to the destination corresponding to the socket for retransmission which has received the response.

Further, according to another embodiment of the present invention, there is provided a transmission method which includes the steps of storing a plurality of destinations of a packet, outputting data to be transmitted, generating a packet containing the data, sequentially performing, to the plurality of destinations, processing of rewriting a destination set in the packet generated by the packet generation processing section by one of the plurality of destinations stored in the storage section and outputting the packet in which the destination is rewritten, and transmitting, every time the packet is output from the virtual interface, the packet to the destination set in the packet.

Further, according to another embodiment of the present invention, there is provided a program for causing a computer to function as a transmission apparatus which includes a virtual interface control section which outputs data to be transmitted, a packet generation processing section which generates a packet containing the data, a storage section which stores a plurality of destinations of the packet, a virtual interface which sequentially performs, to the plurality of destinations, processing of rewriting a destination set in the packet generated by the packet generation processing section by one of the plurality of destinations stored in the storage section, and outputting the packet in which the destination is rewritten, and a real interface which transmits, every time the packet is output from the virtual interface, the packet to the destination set in the packet.

According to the embodiments of the present invention described above, when the transmission apparatus transmits a packet to multiple destinations via a network, the load on a CPU of the transmission apparatus can be reduced regardless of the type of the network.

BRIEF DESCRIPTION OF THE DRAWINGS

FIG. 11 is a schematic view in the case of applying the transmission apparatus according to the present embodiment to TCP communication.

DETAILED DESCRIPTION OF THE EMBODIMENTS

Figure 1:
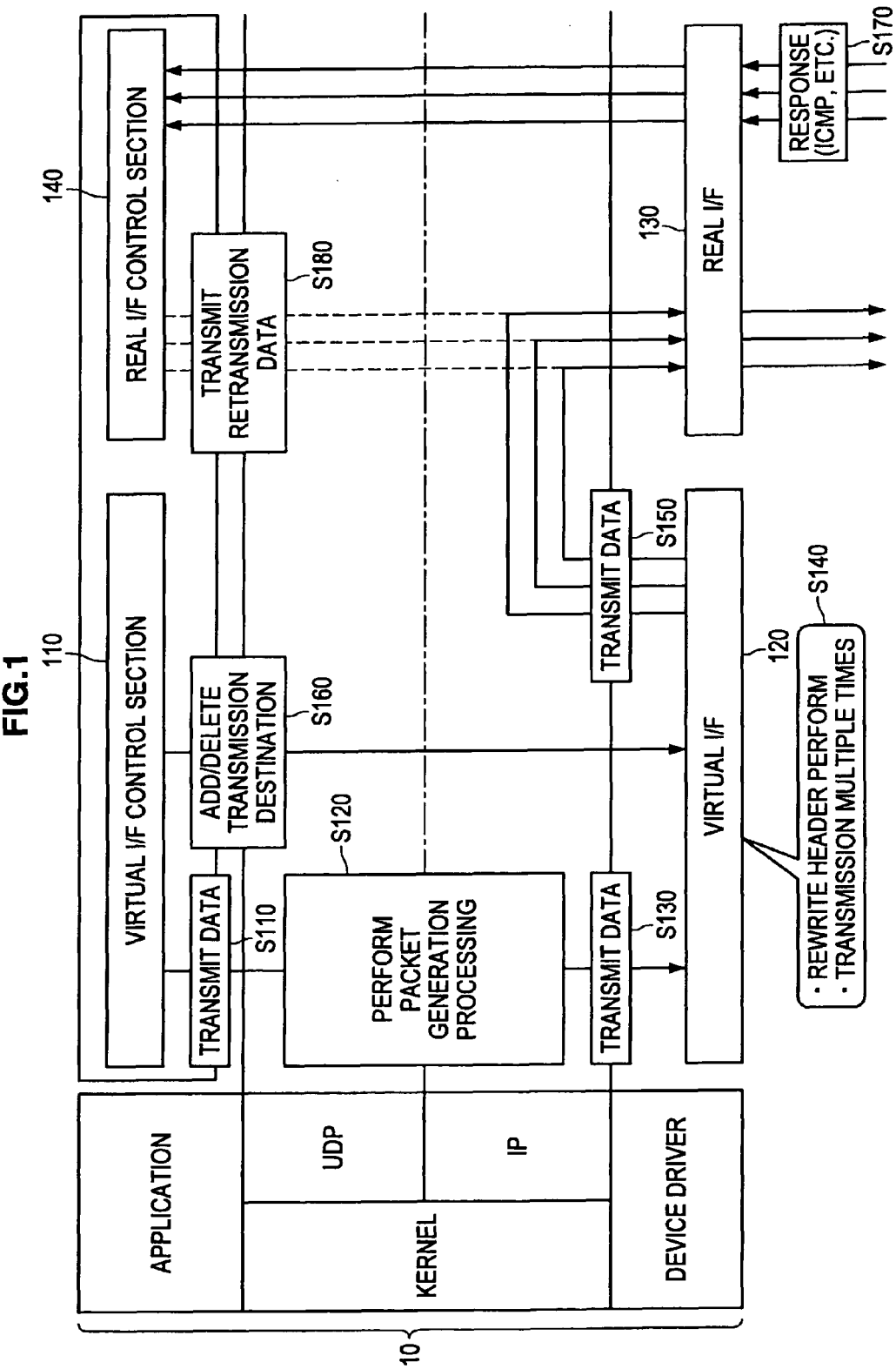
FIG. 1 is a diagram showing a functional configuration of a transmission apparatus according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the following order.

1. Embodiment
1-1. Outline of transmission apparatus
1-2. Functional configuration of transmission apparatus
1-3. Case of not using virtual I/F
1-4. Case of using virtual I/F
1-5. Specific example of operation of transmission apparatus
1-6. Sequence of adding destination performed by transmission apparatus
1-7. Example of operation when transmission apparatus receives ICMP error
1-8. Example of selective retransmission when transmission of RTP data is performed
1-9. Processing executed by virtual I/F
1-10. Case of applying transmission apparatus to TCP communication
2. Modified example
3. Summary 1. Embodiment

[1-1. Outline of Transmission Apparatus]

A transmission apparatus according to the present embodiment will be described. When transmitting identical data to multiple destinations, the transmission apparatus according to the present embodiment transmits the data via a virtual network interface for multipoint transmission (hereinafter, also referred to as "virtual I/F 120"), thereby reducing the number of times of IP packet generation processing which causes a bottleneck and reducing the load on a CPU of the transmission apparatus. The data to be transmitted is, but is not particularly limited to, a video stream or the like.

Further, the virtual I/F 120 of the transmission apparatus can realize multipoint transmission by, while rewriting an IP header and a transport header of a packet in accordance with set destination information, transferring the packet to a real network interface (hereinafter, also referred to as "real I/F 130"). Examples of the transport header include a header of a UDP (User Datagram Protocol) and a header of a TCP (Transmission Control Protocol).

In addition, in the case where the transmission apparatus performs the communication via the virtual I/F 120, a socket which is generated inside the transmission apparatus becomes for transmission-use only, and it is difficult for the transmission apparatus to receive a response such as an ICMP (Internet Control Message Protocol) packet and to perform error control. Accordingly, a socket for reception-use only is generated inside the transmission apparatus, so that the transmission apparatus can receive the response.

Further, the data which is transmitted by the transmission apparatus via the virtual I/F 120 is transmitted to all specified destinations, and hence, it is difficult to selectively retransmit data. Accordingly, the transmission apparatus can perform selective retransmission by generating a socket for retransmission and causing the data to be retransmitted from the generated socket for retransmission.

[1-2. Functional Configuration of Transmission Apparatus]

FIG. 1 is a diagram showing a functional configuration of the transmission apparatus according to the present embodiment. As shown in FIG. 1, in applications executed by a CPU (not shown) which a transmission apparatus 10 is provided with, an application for realizing a virtual I/F control section 110 and an application for realizing a real I/F control section 140 are included. Further, in device drivers executed by the CPU (not shown) which the transmission apparatus 10 is provided with, a device driver for realizing a virtual I/F 120 and a real I/F 130 are included.

In addition thereto, a kernel is executed by the CPU (not shown) which transmission apparatus 10 is provided with. In the kernel, there are included a program for performing processing in accordance with a protocol of a network layer and a program for performing processing in accordance with a protocol of a transport layer. Here, an IP is used as the protocol of the network layer, and a UDP is used as the protocol of the transport layer, but they are not limited thereto. The programs such as those applications, the kernel, and the device drivers are stored in a storage section (not shown) which the transmission apparatus 10 is provided with, for example, and the respective functional blocks (the virtual I/F control section 110, the virtual I/F 120, the real I/F 130, the real I/F control section 140, and the like) are realized by being executed by the CPU.

The data used by the respective functional blocks may be data stored in the storage section (not shown) which the transmission apparatus 10 is provided with, for example. The communication by the real I/F 130 can be performed via a communication device (not shown) which the transmission apparatus 10 is provided with, for example.

The transmission apparatus 10 transmits data to be transmitted to the virtual I/F 120 by the virtual I/F control section 110 (Step S110). Then, after IP packet generation processing (Step S120) is performed in the kernel, the IP packet is transmitted to the virtual I/F 120 by the kernel (Step S130). The functional block for performing the packet generation processing in the kernel particularly functions as an example of a packet generation processing section. While rewriting an IP header and a UDP header (Step S140), the virtual I/F 120 transmits multiple times the packet whose header is rewritten to the real I/F 130 (Step S150), thereby realizing multipoint distribution. The destination of the distribution is controlled by a transmission destination addition/deletion request being output from the virtual I/F control section 110 to the virtual I/F 120 (Step S160).

In the case where a response such as an ICMP error is sent back from the destination to the real I/F 130 (Step S170), since it is difficult for the application to receive the error via the virtual I/F 120, the application receives the error via the real I/F control section 140. In the case where a packet is lost in the network, it is necessary that the transmission apparatus 10 retransmits the packet, but when the packet is retransmitted via the virtual I/F 120, the packet is transmitted to all destinations. When the real I/F control section 140 retransmits the packet only to the destination in which the packet has been lost (Step S180), the selective retransmission can be realized.

[1-3. Case of not Using Virtual I/F]

Figure 2:
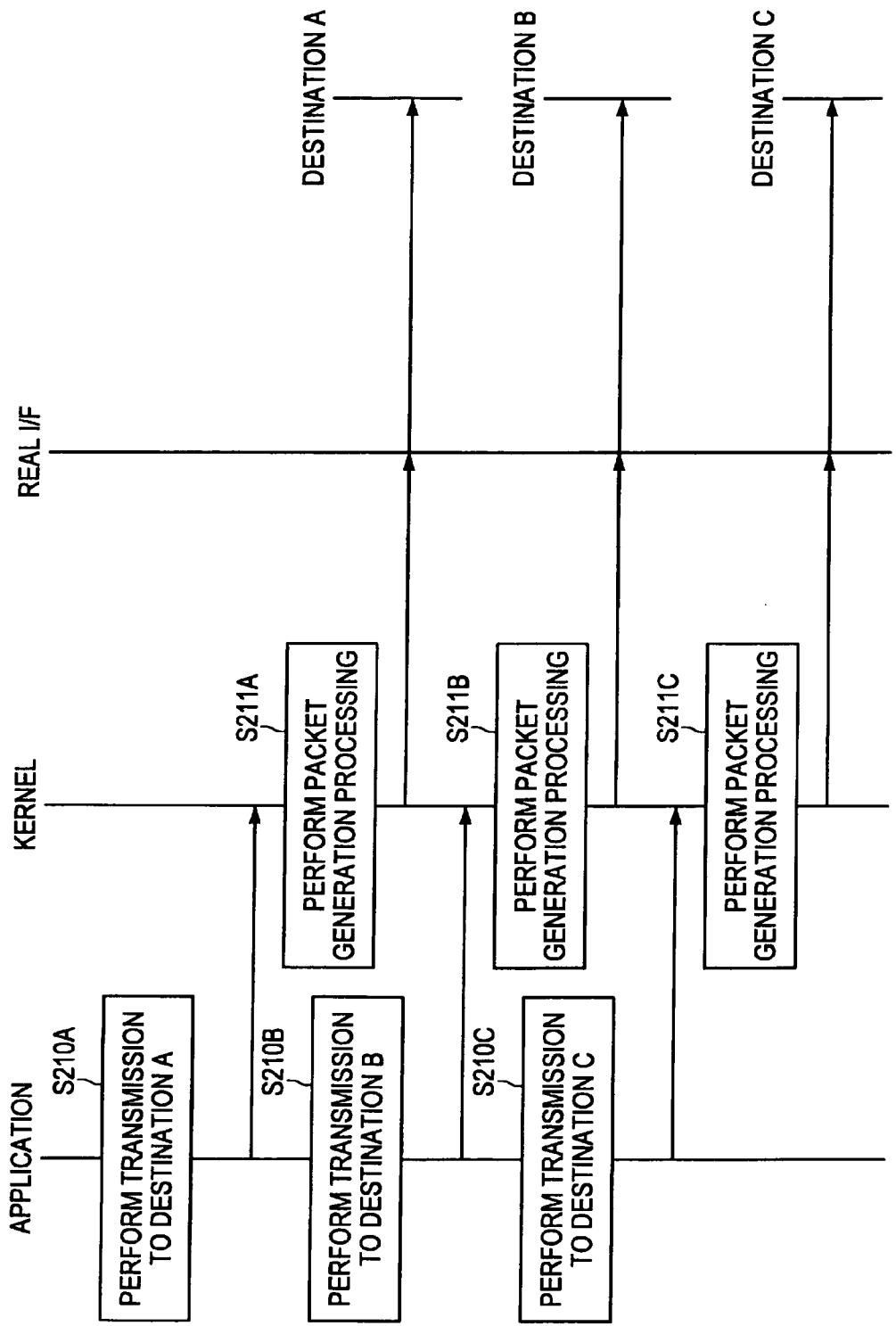
FIG. 2 is a flowchart showing a flow of processing of transmitting identical data to multiple destinations without using a virtual I/F.

FIG. 2 is a flowchart showing a flow of processing of transmitting identical data to three destinations of destinations A to C without using the virtual I/F 120. The transmission apparatus 10 communicates with the destinations A to C via a network. In the case of transmitting identical data to three destinations of destinations A to C without using the virtual I/F 120, an application transmits the data to each of the destinations A to C (Step S210A to Step S210C), and also, the packet generation processing by the kernel is performed three times (Step S211A to Step S211C).

[1-4. Case of Using Virtual I/F]

Figure 3:
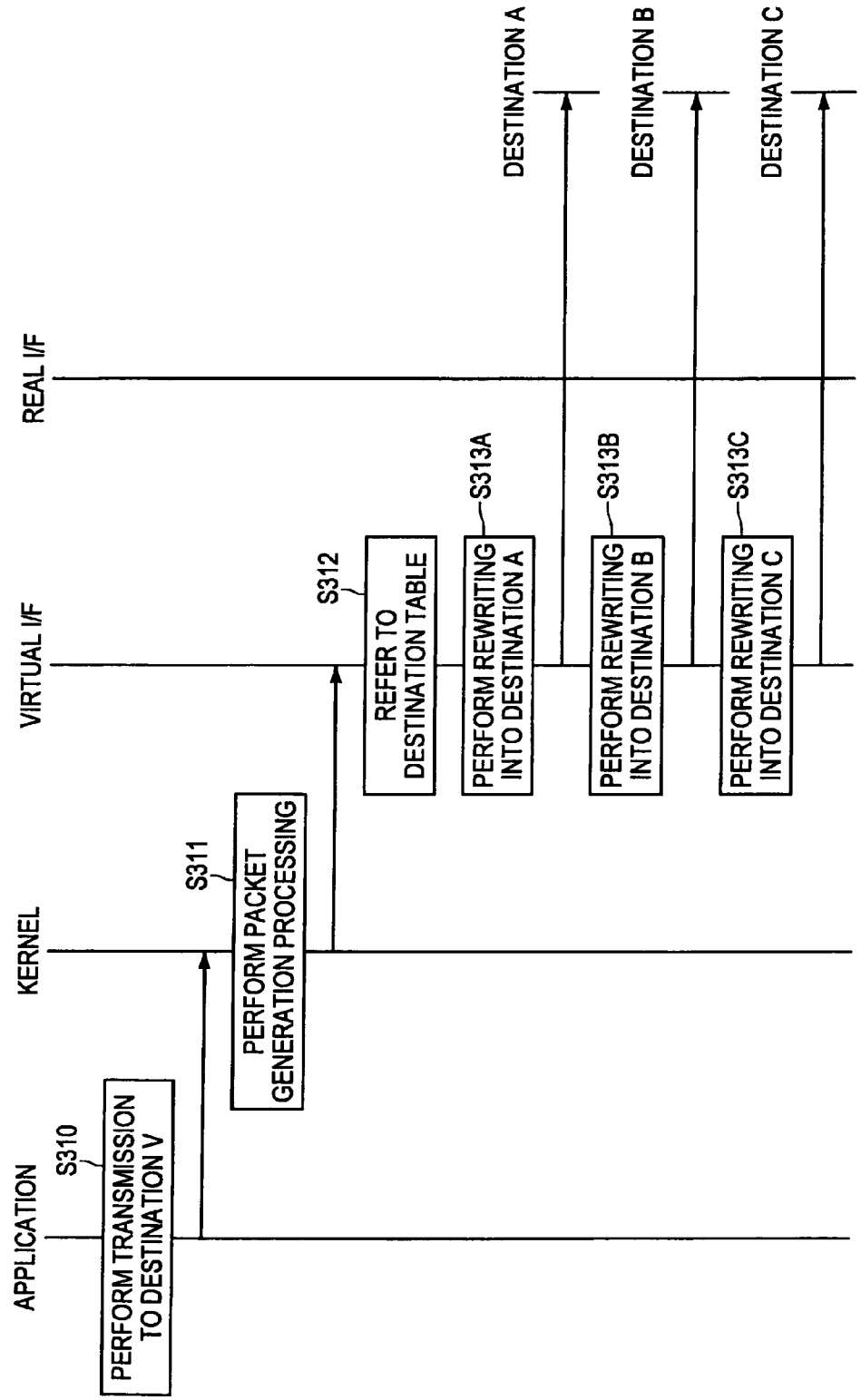
FIG. 3 is a flowchart showing a flow of processing of transmitting identical data to multiple destinations by using a virtual I/F.

FIG. 3 is a flowchart showing a flow of processing of transmitting identical data to three destinations of destinations A to C by using the virtual I/F 120. The transmission apparatus 10 according to the present embodiment transmits identical data to three destinations of destinations A to C by using the virtual I/F 120. An application transmits the data to a destination V, which is a dummy destination (Step S310). The data transmission performed by the application (Step S310) is performed based on data and transmission operation input by a user and the input of which is accepted by an input section (not shown) which the transmission apparatus 10 is provided with.

The kernel generates a packet addressed to the destination V once (Step S311). While referring to a destination table (Step S312) and rewriting the header of the generated packet into the destinations A to C, the virtual I/F 120 transmits three times the packet whose header is rewritten (Step S313A to Step S313C). The destination table is stored in the storage section (not shown) which the transmission apparatus is provided with, and is read and used by the virtual I/F 120. In this way, in the case of using the virtual I/F 120, the packet generation processing is only performed once, and hence, the load on the CPU is lightened.

[1-5. Specific Example of Operation of Transmission Apparatus]

Figure 4:
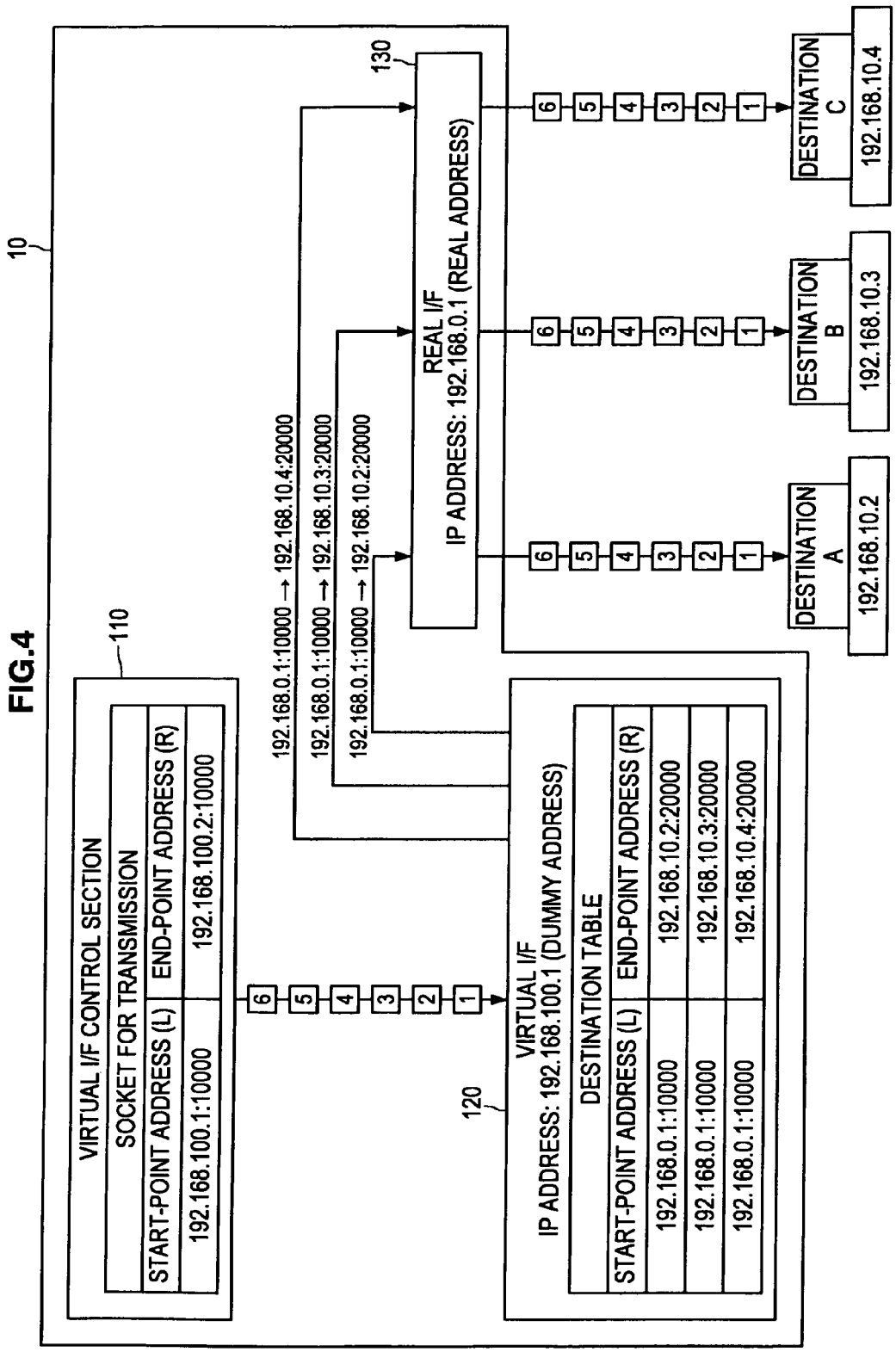
FIG. 4 is a diagram showing a specific example of operation of the transmission apparatus according to the present embodiment.

FIG. 4 is a diagram showing a specific example of operation of the transmission apparatus 10. As the address of the virtual I/F 120, a dummy address "192.168.100.1" is set, for example. The virtual I/F control section 110 creates a socket to which the dummy address is bound using bind( ), and connects the socket to "192.168.100.2" as a dummy destination using connect( ). In the destination table, there are set "(start-point address) 192.168.0.1:10000, (end-point address) 192.168.10.2:20000", "(start-point address) 192.168.0.1:10000, (end-point address) 192.168.10.3:20000", and "(end-point address) 192.168.0.1:10000, (end-point address) 192.168.10.4:20000". Those settings are edited by ioctl( ).

When the virtual I/F control section 110 transmits the data from the created socket, the data is IP-packetized in the kernel, and the IP packet arrives at the virtual I/F 120. The virtual I/F 120 transfers the IP packet to the real I/F 130 while rewriting the header of the IP packet in accordance with the destination table. The real I/F 130 transmits the IP packet whose header is rewritten to the network as it is. Since the header is rewritten in the virtual I/F 120, it is difficult to distinguish the packet transmitted by the technique described above from the packet transmitted by a general technique at the side of receiving the packet.

[1-6. Sequence of Adding Destination Performed by Transmission Apparatus]

Figure 5:
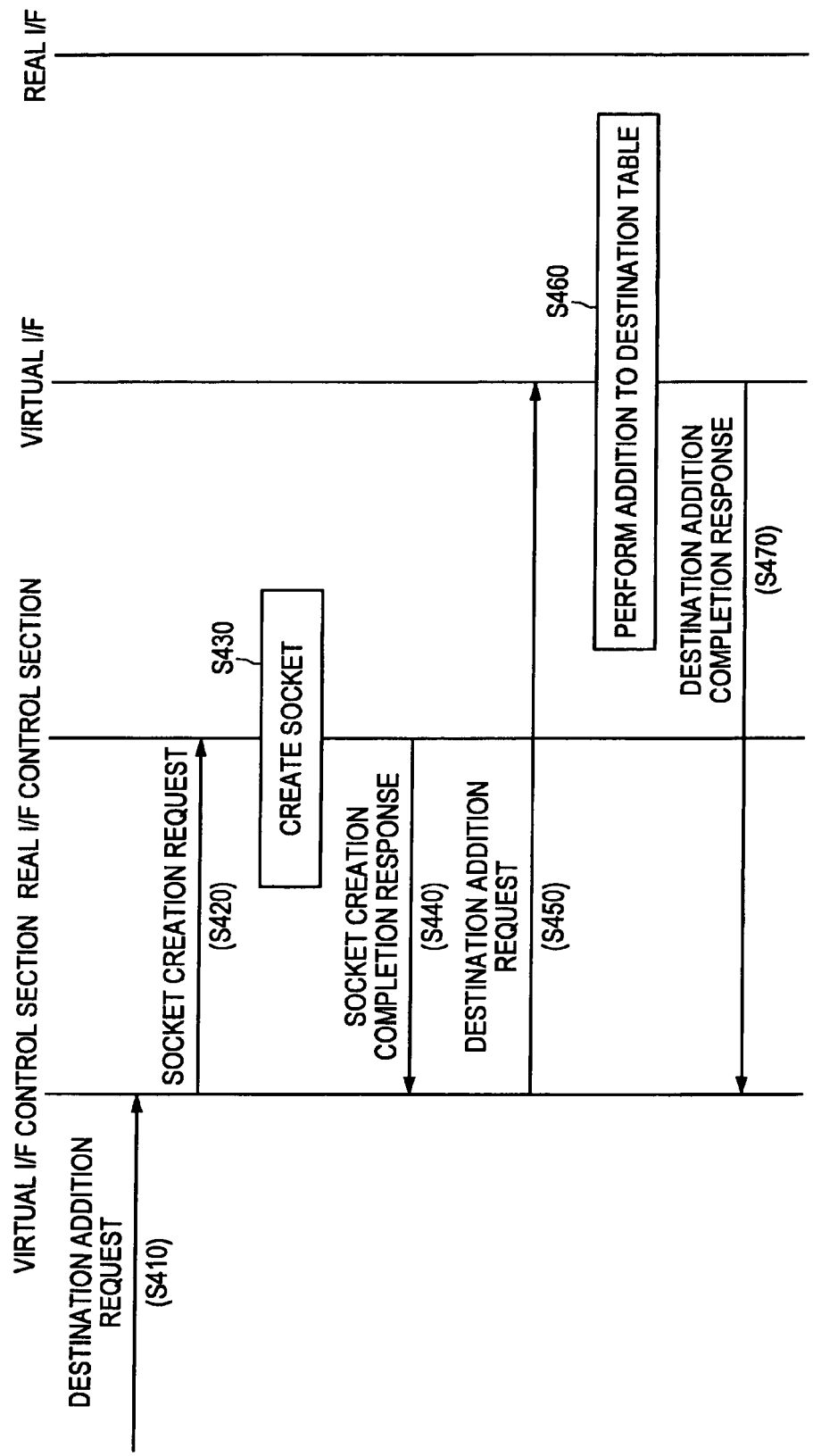
FIG. 5 shows a sequence of adding a destination performed by the transmission apparatus according to the present embodiment.

FIG. 5 shows a sequence of adding a destination performed by the transmission apparatus 10. First, the virtual I/F control section 110 receives a destination addition request (Step S410), and requests the real I/F control section 140 to create a socket for reception/retransmission (Step S420). The destination addition request received by the virtual I/F control section 110 is performed based on the destination and the destination addition operation input by a user and the input of which is accepted by an input section (not shown) which the transmission apparatus 10 is provided with. After creating the socket (Step S430), the real I/F control section 140 sends back a socket creation completion response (Step S440). After that, the virtual I/F control section 110 transmits a destination addition request to the virtual I/F 120 (Step S450), and the virtual I/F 120 adds a destination specified by the destination addition request to a destination table (Step S460). When the addition of the destination is finished, the virtual I/F 120 sends back a destination addition completion response to the virtual I/F control section 110 (Step S470).

[1-7. Example of Operation when Transmission Apparatus Receives ICMP Error]

Figure 6:
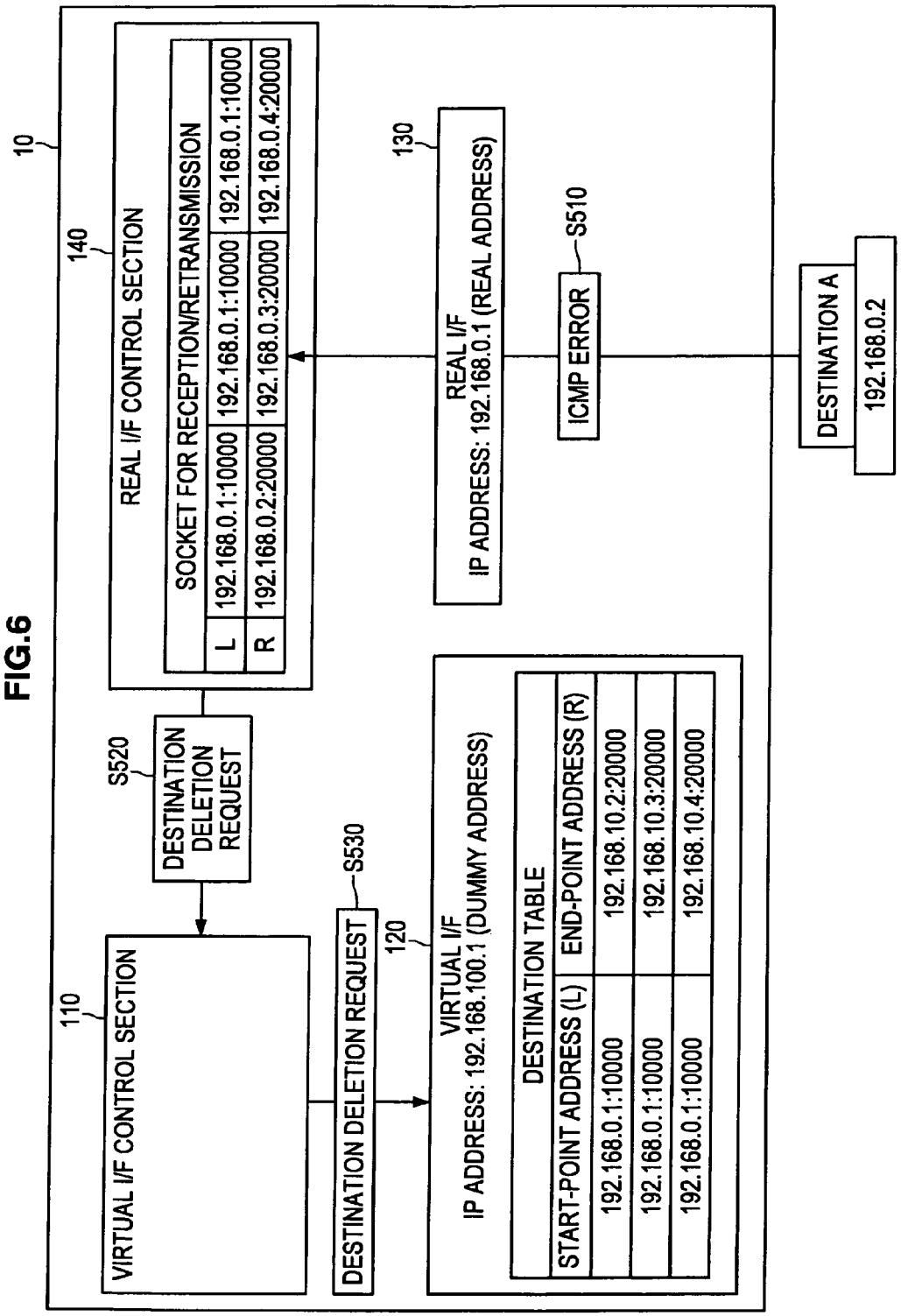
FIG. 6 is a diagram showing an example of operation when the transmission apparatus according to the present embodiment receives an ICMP error.

FIG. 6 is a diagram showing an example of operation when the transmission apparatus 10 receives an ICMP error. The real I/F control section 140 receives the ICMP error via the real I/F 130 using the socket for reception/retransmission (Step S510), and transmits a destination deletion request to the virtual I/F control section 110 so as to stop data transmission to the destination in which the ICMP error has occurred (Step S520). When the virtual I/F control section 110 receives the destination deletion request, the virtual I/F control section 110 transmits a destination deletion request to the virtual I/F 120 (Step S530), and when the virtual I/F 120 receives the destination deletion request, the virtual I/F 120 deletes a destination specified by the destination deletion request from a destination table. Thus, the data transmission to the destination is stopped.

Figure 7:
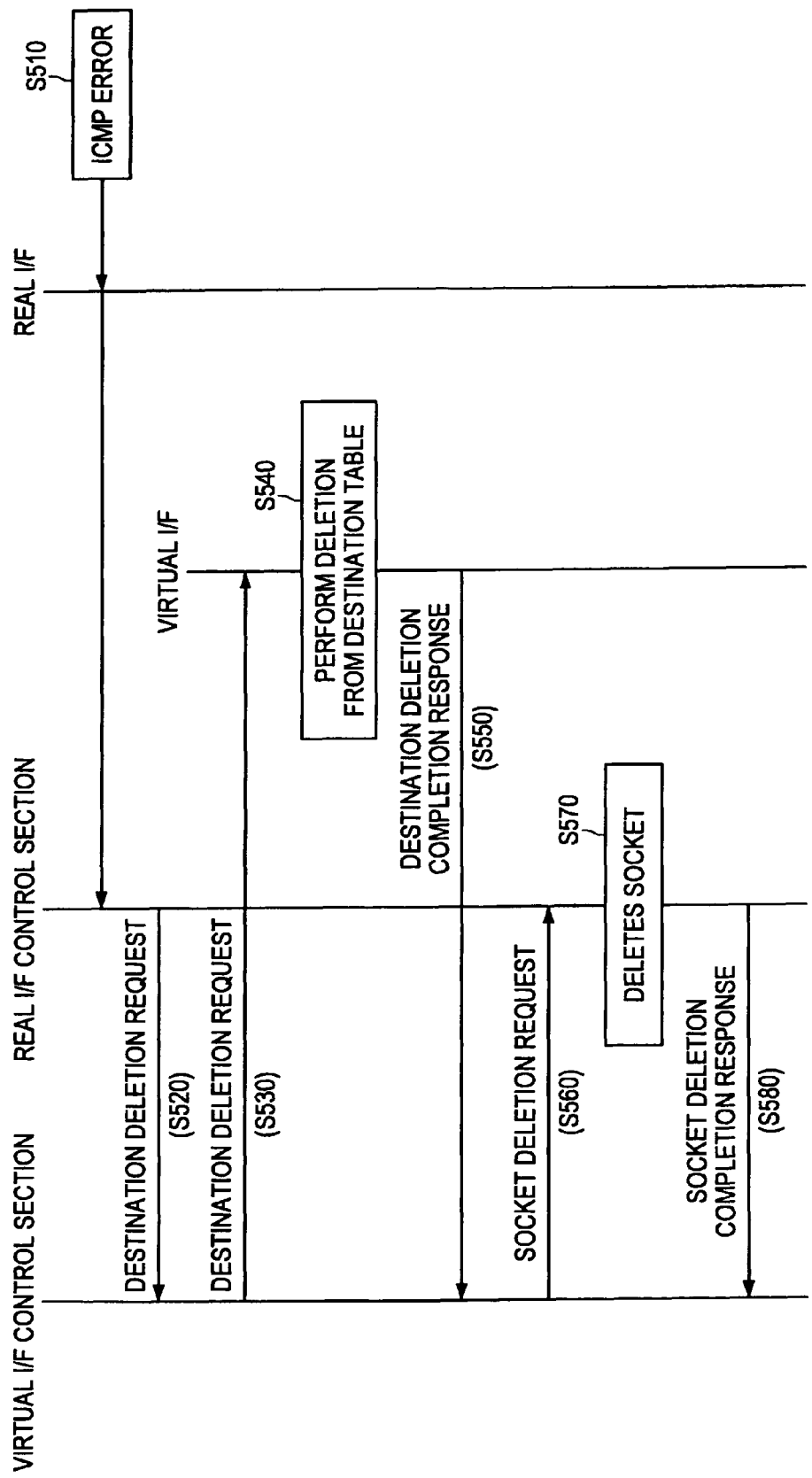
FIG. 7 is a diagram which expresses the processing shown in FIG. 6 as a sequence diagram.

FIG. 7 is a diagram which expresses the processing shown in FIG. 6 as a sequence diagram. First, when receiving the ICMP error (Step S510), the real I/F 130 transmits the ICMP error to the real I/F control section 140. When receiving the ICMP error using the socket for reception/retransmission, the real I/F control section 140 transmits the destination deletion request to the virtual I/F control section 110 (Step S520).

When receiving the destination deletion request, the virtual I/F control section 110 transmits the destination deletion request to the virtual I/F 120 (Step S530).

The virtual I/F 120 deletes the destination specified by the destination deletion request from the destination table (Step S540), and when the deletion of the destination is completed, sends back a destination deletion completion response to the virtual I/F control section 110 (Step S550). When receiving the destination deletion completion response, the virtual I/F control section 110 transmits a socket deletion request to the real I/F control section 140 (Step S560). When receiving the socket deletion request, the real I/F control section 140 deletes a socket for reception/retransmission corresponding to the destination (Step S570), and transmits a socket deletion completion response to the virtual I/F control section 110 (Step S580).

[1-8. Example of Selective Retransmission when Transmission of RTP Data is Performed]

Figure 8:
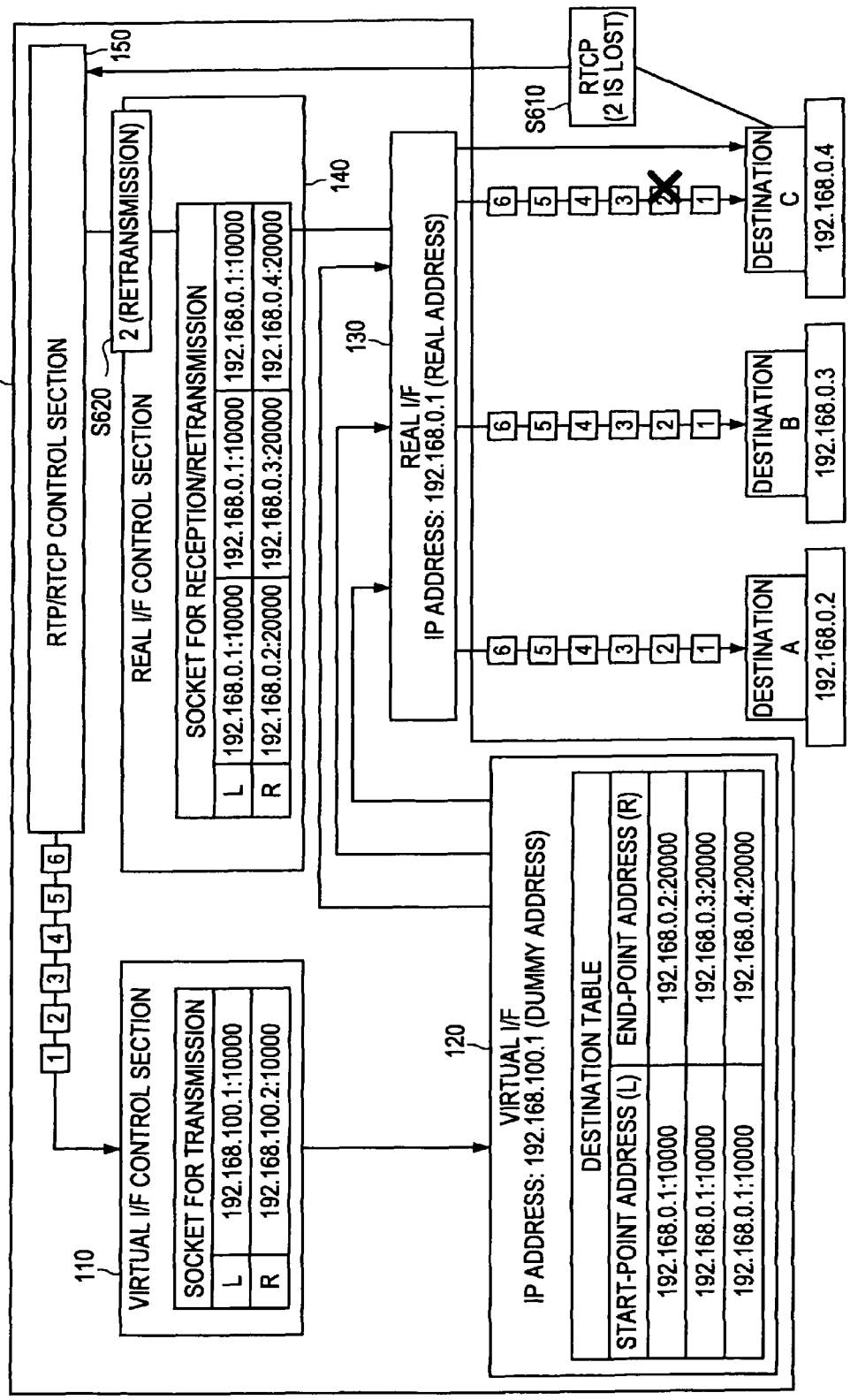
FIG. 8 is a diagram showing a selective retransmission example when the transmission apparatus according to the present embodiment is applied to RTP/RTCP streaming.

FIG. 8 is a diagram showing a selective retransmission example when the transmission apparatus according to the present embodiment is applied to RTP/RTCP streaming. In the RTP (Real Time Protocol)/RTCP (RTP Control Protocol) streaming, the notification of a loss of an RTP packet is performed using the RTCP and the retransmission can be prompted to the transmission apparatus 10. In the example shown in FIG. 8, a terminal (destination C) of "192.168.0.4" detects that a packet "2" is lost, and the notification of the loss of the packet "2" to the transmission apparatus 10 is performed by using the RTCP (Step S610). An RTP/RTCP control section 150 transmits to the real I/F control section 140 the fact that the packet "2" is lost (Step S620), and the real I/F control section 140 receives the fact that the packet "2" is lost using a socket for reception/retransmission corresponding to the destination C, and retransmits a packet only to the terminal (destination C) of "192.168.0.4" via the real I/F 130.

Figure 9:
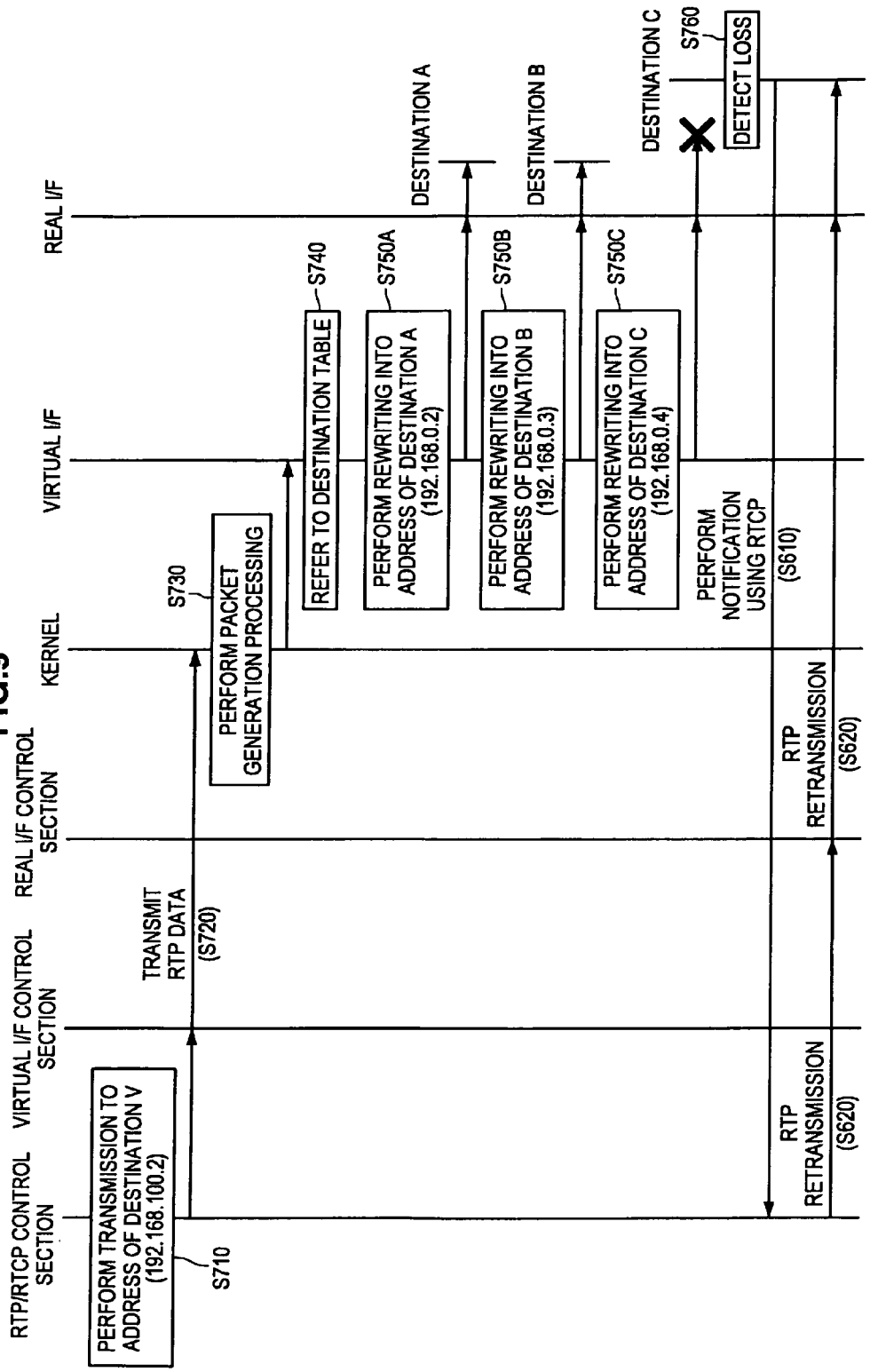
FIG. 9 is a diagram which expresses the processing shown in FIG. 8 as a sequence diagram.

FIG. 9 is a diagram which expresses the processing shown in FIG. 8 as a sequence diagram. The RTP/RTCP control section 150 transmits RTP data to be transmitted to an address of the destination V, "192.168.100.2" (Step S710), and the virtual I/F control section 110 transmits the received RTP data to the kernel (Step S720). When receiving the RTP data, the kernel generates a packet containing the RTP data (Step S730), and transmits the generated packet to the virtual I/F 120. While the virtual I/F 120 refers to the destination table (Step S740) and rewrites the header of the generated packet into the addresses of the destinations A to C (Step S750A to Step S750C), the virtual I/F 120 transmits three times the packet whose header is rewritten.

When the packet loss is detected by the destination C (Step S760), the destination C notifies the RTP/RTCP control section 150 of the notification using the RTCP (Step S610), and the RTP/RTCP control section 150 transmits an RTP retransmission request to the real I/F control section 140 (Step S620). When receiving the RTP retransmission request, the real I/F control section 140 retransmits a packet only to the destination C via the real I/F 130 (Step S620).

[1-9. Processing Executed by Virtual I/F]

Figure 10:
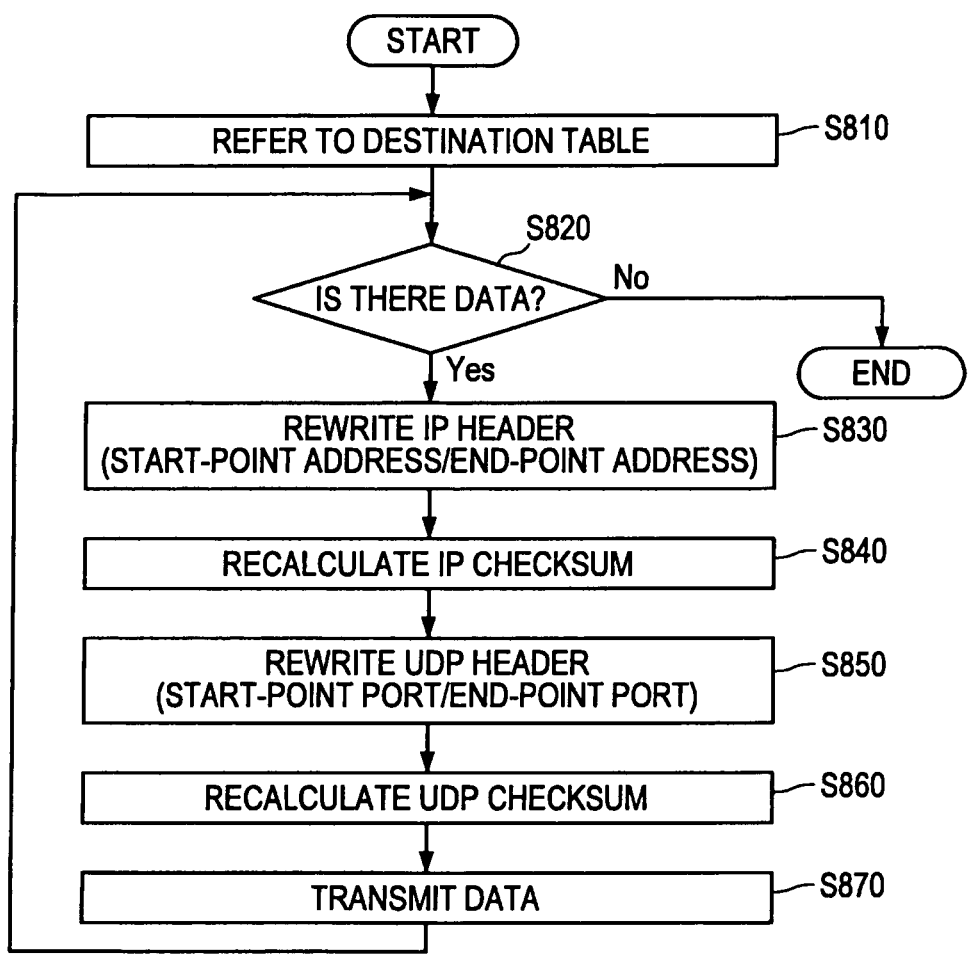
FIG. 10 shows a flowchart of processing executed by a virtual I/F.

FIG. 10 shows a flowchart of processing executed by the virtual I/F 120. When receiving an IP packet from the kernel, the virtual I/F 120 refers to the destination table (Step S810). When there is destination data in the destination table ("Yes" in Step S820), the virtual I/F 120 rewrites a header (IP header) of the IP packet based on the destination data (Step S830), and recalculates an IP checksum (Step S840). Then, the virtual I/F 120 rewrites a UDP header of the IP packet (Step S850), recalculates a UDP checksum (Step S860), and transmits the IP packet to the real I/F 130 (Step S870). The virtual I/F 120 performs the processing shown in Step S830 to Step S870 until no destination data remains in the destination table, and when there is no destination data in the destination table ("No" in Step S820), the processing is terminated.

[1-10. Case of Applying Transmission Apparatus to TCP Communication]

FIG. 11 is a schematic view in the case of applying the transmission apparatus according to the present embodiment to TCP communication. Step S910 to Step S940 and Step S960 are performed in almost the same manner as in the case of performing UDP communication. Note that, in the case of performing the TCP communication, retransmission and rate control are performed in the TCP layer, and hence, it is necessary that the virtual I/F 120 transfer the IP packet to the TCP layer after rewriting the header of the IP packet (Step S950). In the case of performing the UDP communication, the virtual I/F 120 directly transfers the IP packet to the IP layer.

When a loss of a packet is detected from the contents of TCP ACK (Step S970), the kernel performs, in the TCP processing, selective retransmission without performing notification to the application (Step S980). The real I/F control section 140 only performs generation/deletion of a socket regardless of the selective retransmission processing (Step S990). For example, in the case where TCP RST is arrived, the real I/F control section 140 is notified of the arrival of the TCP RST in the TCP processing of the kernel, and the real I/F control section 140 performs processing such as socket deletion. In the case where the transmission apparatus according to the present embodiment is applied to the TCP communication, although the amount of the load on a CPU that is reduced is less than the amount of the load on a CPU that is reduced in the case of the UDP communication, the efficiency can be enhanced even more when compared to general communication.

2. Modified Example

It should be understood by those skilled in the art that various modifications, combinations, sub-combinations and alterations may occur depending on design requirements and other factors insofar as they are within the scope of the appended claims or the equivalents thereof.

For example, it is not necessary that the steps shown in the sequence diagrams and the flowcharts used in the present embodiment are executed in the order shown in the sequence diagrams and the flowcharts. That is, the order of the steps shown in the sequence diagrams and the flowcharts used in the present embodiment may be appropriately changed and executed.

3. Summary

According to the present embodiment, when the transmission apparatus transmits a packet to multiple destinations via a network, the load on the CPU of the transmission apparatus can be reduced regardless of the type of the network. That is, for example, even when the network does not support IP multicast, the transmission apparatus can transmit a packet to multiple destinations via the network while reducing the load on the CPU of the transmission apparatus.

Accordingly, the load on the CPU of the transmission apparatus when the transmission apparatus distributes data is reduced, and hence, it becomes possible for the transmission apparatus to distribute data to more destinations. Further, since the load on the CPU of the transmission apparatus can be reduced, it becomes easy to perform processing other than the data distribution while performing the data distribution.

The transmission apparatus according to the present embodiment is particularly suitable when performing multipoint distribution or the like by an embedded device whose CPU capability is limited.

The present application contains subject matter related to that disclosed in Japanese Priority Patent Application JP 2010-079071 filed in the Japan Patent Office on Mar. 30, 2010, the entire content of which is hereby incorporated by reference.

What is claimed is:

1. A transmission apparatus comprising:
one or more processors that:
output data to be transmitted;
generate a packet containing the data;
store a plurality of destinations of the packet in a storage section;
sequentially perform, for the plurality of destinations, a process of rewriting a destination set in the packet by one of the plurality of destinations stored in the storage section, and output the packet in which the destination set is rewritten;
transmit, every time the packet is output, the packet to the destination set in the packet;
generate a socket for reception for each of the plurality of destinations; and
output a destination deletion request indicating that a destination corresponding to the socket for reception which has received the response is deleted from the plurality of destinations when receiving a response indicating that an error in transmission of the packet has occurred using the generated socket for reception.

2. The transmission apparatus according to claim 1, wherein the one or more processors:
generate a socket for transmission, and output the packet to the generated socket for transmission.

3. The transmission apparatus according to claim 1,
wherein, when the destination deletion request is output, the one or more processors delete the destination from the plurality of destinations stored in the storage section.

4. The transmission apparatus according to claim 1, wherein the one or more processors generate a socket for retransmission for each of the destinations stored in the storage section, and when receiving a response indicating that a loss of the packet has occurred using the generated socket for retransmission, retransmit the packet which is lost to the destination corresponding to the socket for retransmission which has received the response.

5. A transmission method, comprising:
storing a plurality of destinations of a packet;
outputting data to be transmitted;
generating a packet containing the data;
sequentially performing, for the plurality of destinations, a process of rewriting a destination set in the packet by one of the plurality of destinations, and outputting the packet in which the destination set is rewritten;
transmitting, every time the packet is output, the packet to the destination set in the packet;
generating a socket for reception for each of the plurality of destinations; and
outputting a destination deletion request indicating that a destination corresponding to the socket for reception which has received the response is deleted from the plurality of destinations when receiving a response indicating that an error in transmission of the packet has occurred using the generated socket for reception.

6. The transmission method according to claim 5, further comprising:
generating a socket for transmission, and outputting the packet to the generated socket for transmission.

7. The transmission method according to claim 5, further comprising deleting the destination from the plurality of destinations stored in the storage section when the destination deletion request is output.

8. The transmission method according to claim 5, further comprising generating a socket for retransmission for each of the destinations, and when receiving a response indicating that a loss of the packet has occurred using the generated socket for retransmission, retransmit the packet which is lost to the destination corresponding to the socket for retransmission which has received the response.

9. A non-transitory computer-readable storage medium having stored thereon, a computer program having at least one code section for communication, the at least one code section being executable by a computer for causing the computer to perform steps comprising:
outputting data to be transmitted;
generating a packet containing the data;
storing a plurality of destinations of the packet;
sequentially performing, for the plurality of destinations, a process of rewriting a destination set in the packet by one of the plurality of destinations, and outputting the packet in which the destination is rewritten; and
transmitting, every time the packet is output, the packet to the destination set in the packet;
generating a socket for reception for each of the plurality of destinations; and
outputting a destination deletion request indicating that a destination corresponding to the socket for reception which has received the response is deleted from the plurality of destinations when receiving a response indicating that an error in transmission of the packet has occurred using the generated socket for reception.

* * * * *